Patented Apr. 11, 1950

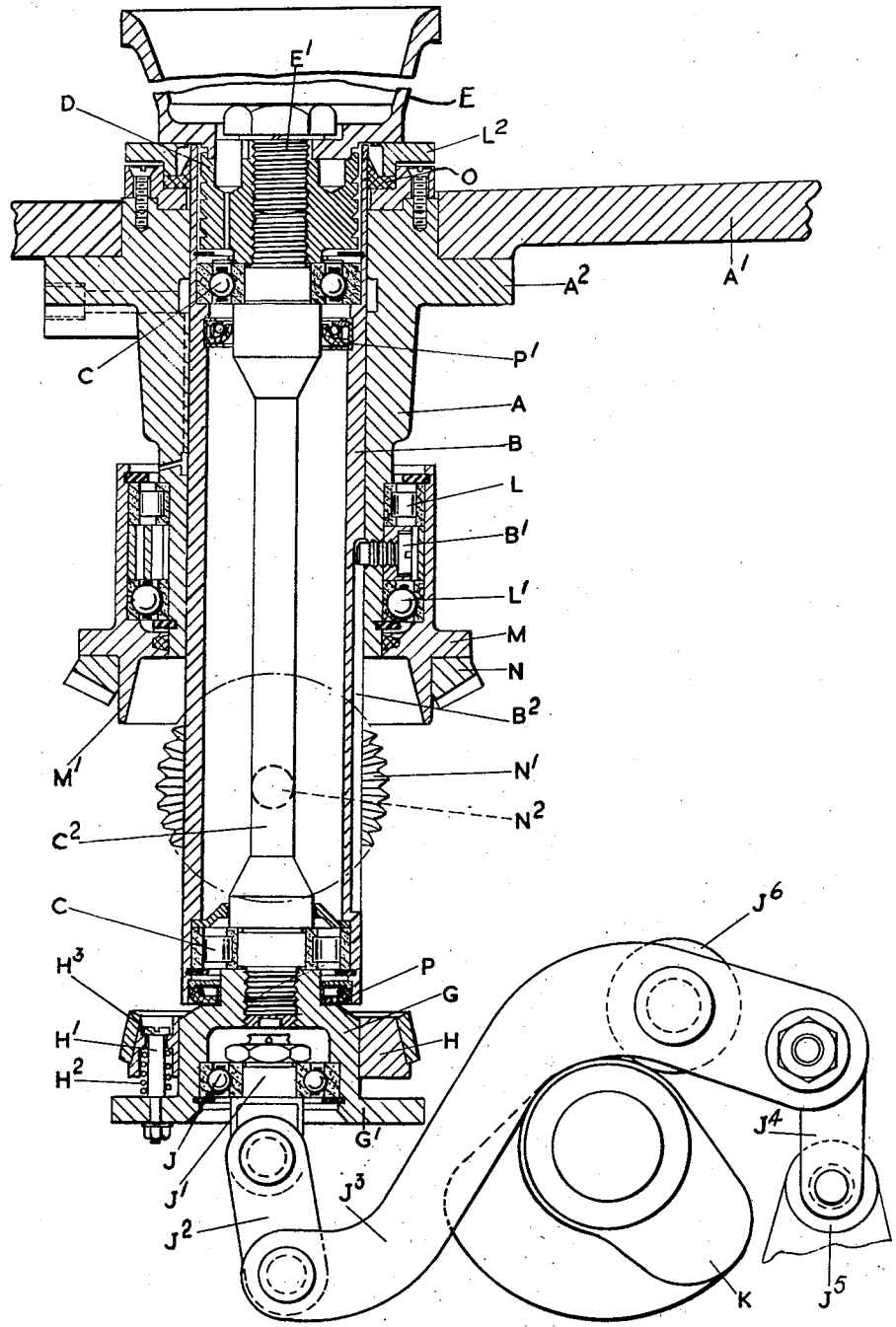

2,503,678

UNITED STATES PATENT OFFICE 2,503,678

ROTARY SUPPORT FOR SUBSTANCES OR PARTICLES TO BE FORMED OR TREATED

Sydney Jack Moore, London, England, assignor to Sulzer Bros. (London) Limited, London, England, a company of Great Britain, and Josiah Wedgwood & Sons Limited, Stoke-on-Trent, Staffordshire, England, a company of Great Britain Application June 3, 1949, Serial No. 96,872
In Great Britain June 16, 1948

6 Claims. (Cl. 25—26)

This invention relates to apparatus for supporting a substance or article, rotating it and bringing it into engagement with a former or tool for shaping or treating its surface and is particularly, but not exclusively applicable to rotary supports, as used in the manufacture of pottery and like articles from clay or like material, wherein a suitable quantity of clay or the like is deposited upon a rotary support and is then brought by the support into engagement with a shaping tool, former or die which shapes the clay or wherein a partially formed pottery or like article is brought by a rotating support into engagement with a tool or former which applies a shaping, finishing or like operation to it.

The principal object of the invention is to provide an improved construction having satisfactory mechanical characteristics so as to give long and efficient service and at the same time to be convenient and capable if desired of being readily built into a machine so as to form a unit therewith.

Apparatus for supporting a substance or article, rotating it and bringing it into engagement with a former or tool for shaping or treating its surface according to the present invention includes in combination a guide, a tube mounted to slide axially in the guide, a shaft mounted to rotate within and supported on bearings from the tube, a head secured to one end of the shaft for supporting the substance or article to be treated, means for moving the shaft and tube assembly axially relatively to the guide to move the head towards and away from a former or tool for acting on the substance or article carried thereby, a power driven rotary member coaxial with the shaft and tube, and complementary driving and driven clutch members secured respectively to the rotary member and to the end of the shaft remote from the head and arranged so as to come into engagement when the shaft and tube assembly is moved to bring the head into proximity to the former or tool.

If desired, co-operating rotary and stationary braking elements for the shaft may also be provided, these being secured respectively to the shaft and to a non-rotary part in such positions that they come into engagement when the shaft and tube assembly is moved to bring the head into a position remote from the former or tool.

Further, a telescopic tubular shield may in some cases be provided between the head and the guide to exclude foreign matter from entering between the guide and the tube as the head moves relatively to the guide.

The axial movement of the tube and shaft assembly may be effected in various ways but in one convenient arrangement the end of the shaft remote from the head is connected through one or more bearings, preferably of the ball or roller type, to an operating member through which the required movement is transmitted to the shaft assembly as through an arm cam or the like.

The invention may be carried into practice in various ways but one construction according to the invention suitable for use, for example in a machine of the kind described in the specification of United States patent application Serial No. 77,122, owned by the assignee of this application, is illustrated by way of example in the accompanying drawing, which is a sectional side elevation.

The machine in which the apparatus shown in the drawing may be incorporated is not illustrated as a whole and will not be described in detail since in itself it forms no part of the present invention and is fully described and illustrated in the specification and drawings of co-pending United States patent application Serial No. 77,122. It includes a rotary conveying device having a number of circumferentially spaced seatings or sockets each adapted to receive a mould in which an article is to be shaped. The rotary conveyor has step-by-step rotary movement imparted to it so that each mould is brought in succession into a series of stations. At the first of these stations (hereinafter called the receiving station) each seating receives a mould which is then conveyed in turn to one or more stations (hereinafter called the intermediate stations), and finally to a discharge station at which the moulds are removed from the rotary conveyor with the formed or partially formed articles within them. It will be understood that the rotary conveyor remains stationary after each movement for sufficient time to permit the required functions to be performed at the various stations.

Thus, in one example, each mould is received by the rotary conveyor at the receiving station, for example from a chain conveyor, passes to the next station (hereinafter called the clay supply station), at which it receives a quantity of clay sufficient to form the desired article, and then to a forming station in which the clay is formed, at least roughly into the article to be made. The mould may then pass on to the discharge station either directly or through one or more further forming stations.

The apparatus according to the invention illustrated comprises a vertical tubular guide A secured to a stationary part $A^1$ of the machine with which the apparatus is to be used, and disposed so that it lies vertically below each mould when it occupies the forming station. Since the form of the mould and the mechanism for bringing each mould into the forming station forms no part of the present invention it is not illustrated but as stated above, such mechanism may be of the kind described in the specification of United States patent application Serial No. 77,122 above referred to or of known kind.

As shown, the tubular guide A has a flange $A^2$ at its upper end by which it is secured to the part $A^1$, and mounted to slide vertically within the guide A is an axially movable tube B which is held from rotation relatively to the guide A by a setscrew $B^1$ engaging a groove $B^2$ in the tube B.

Supported coaxially within the tube B in bearings C, $C^1$ is a shaft $C^2$ the upper end of which has secured to it a connecting piece D screwed thereto and serving to connect the shaft to a cup-like member E adapted to contain and carry a mould (not shown) in which a pottery article is to be formed.

It will be seen that the mould carrier E is secured to the connecting piece D by a bolt $E^1$, which thus permits the ready removal and replacement of the mould carrier when desired.

Secured to the lower end of the shaft $C^2$ is a guide member G provided with an external cylindrical guide portion terminating at its lower end in a flange $G^1$. Mounted to slide on the guide portion is one member H of a cone clutch, this member having a number of axial bores spaced around it in which lie pins $H^1$ secured to the flange $G^1$ so that the clutch member H can slide to a limited extent but not rotate relatively to the guide member G. Only one of the pins $H^1$ appears in the drawings but it will be understood that three or more of them are spaced around the member H.

Helical compression springs $H^2$ acting on the member H surround the pins $H^1$ and serve normally to hold the member H against the heads $H^3$ of the pins as shown, these heads thus acting as stops to limit upward movement of the member H relatively to the member G.

Mounted on thrust bearings J within the member G is an actuating or connecting member $J^1$ which is connected by a link $J^2$ to one end of a lever $J^3$ the other end of which is connected by a link $J^4$ to a fixed part $J^5$ while an intermediate point is acted upon by a cam K through a roller $J^6$.

Mounted on bearings L, $L^1$ on the lower end of the tubular guide A is a rotary sleeve M the lower end of which is formed as a clutch member $M^1$ adapted to co-operate with the clutch member H when it is raised by the cam K.

Rigidly connected to the sleeve M is a bevel wheel N which meshes with a bevel wheel $N^1$ on the shaft of an electric motor or other driving shaft $N^2$ so as to be continuously rotated.

In operation, when the tube B and its associated parts are raised by the cam K, the clutch member H comes into engagement with the constantly driven clutch member $M^1$. The springs $H^2$ will be slightly compressed beyond their normal compression when the clutch is engaged so that they control the force of engagement and ensure satisfactory engagement without the necessity for very accurate control of the extent of upward movement of the tube B.

Rotation is therefore imparted to the shaft $C^2$ and the mould carrier E as the latter reaches its upper position.

After the completion of the appropriate operation the member B is again lowered by the cam K into the position shown.

In order to check the rotation of the mould carrier after it has been lowered, a friction pad $L^2$ is provided on the upper end of the guide A on to which the mould carrier E is lowered and which thus acts as a brake.

In order to prevent clay or other foreign matter entering the space around the mould carrier E and from accumulating on the sliding surface of the tube B when the latter is raised, and being drawn into the working clearance between this surface and the guide A, a rubber or like seal O is secured to the guide A and closely engages the outer surface of the tube B.

Seals P and $P^1$ may also be provided respectively between the lower end of the tube B and the member G and between the tube B and a part of the shaft $C^2$ immediately below the bearing C to retain lubricant in these bearings and prevent the entry of foreign matter.

What I claim as my invention and desire to secure by Letters Patent is:

1. Apparatus for supporting a substance or article, rotating it and bringing it into engagement with a former or tool for shaping or treating its surface, including in combination a guide, a tube mounted to slide axially in the guide with its ends projecting from the guide, a shaft mounted to rotate within and supported on bearings from the tube, a head secured to one end of the shaft for supporting the substance or article to be treated, means for moving the shaft and tube assembly axially relatively to the guide to move the head towards and away from a former or tool for acting on the substance or article carried thereby, a power driven rotary member coaxial with the shaft and tube, and complementary driving and driven clutch members secured respectively to the rotary member and to the end of the shaft remote from the head and arranged so as to come into engagement when the shaft and tube assembly is moved to bring the head into proximity to the former or tool.

2. Apparatus for supporting a substance or article, rotating it and bringing it into engagement with a former or tool for shaping or treating it as claimed in claim 1, in which one of the clutch members is secured to the member carrying it in a manner permitting limited axial movement but not rotation relatively thereto and one or more springs are provided normally holding the clutch member against a stop or stops which limit its axial movement relatively to the member supporting it in a direction towards the other clutch member, but permitting limited axial movement thereof against the action of the spring or springs when the two clutch members are brought into engagement.

3. Apparatus for supporting a substance or article, rotating it and bringing it into engagement with a former or tool for shaping or treating it as claimed in claim 1 including cooperating rotary and stationary braking elements connected respectively to the shaft and to a nonrotary part in such positions that they come into engagement when the shaft and tube assembly is moved to bring the head into a position remote from the former or tool.

4. Apparatus for supporting a substance or article, rotating it and bringing it into engagement with a former or tool for shaping or treating it as claimed in claim 3, in which one of the clutch members is secured to the member carrying it in a manner permitting limited axial movement but not rotation relatively thereto and one or more springs are provided normally holding the clutch member against a stop or stops which limit its axial movement relatively to the member supporting it in a direction towards the other clutch member, but permitting limited axial movement thereof against the action of the spring or springs when the two clutch members are brought into engagement.

5. Apparatus for supporting a substance or article, rotating it and bringing it into engagement with a former or tool for shaping or treating it as claimed in claim 1 including a tubular telescopic shield extending between the head and the guide to exclude foreign matter as the head moves relatively to the guide.

6. Apparatus for supporting a substance or article, rotating it and bringing it into engagement with a former or tool for shaping or treating it as claimed in claim 1 including a connecting member connected to the end of the shaft remote from the head through bearings and means for transmitting axial movement to the shaft through said connecting member.

SYDNEY JACK MOORE.

REFERENCES CITED

The following references are of record in the file of this patent:

UNITED STATES PATENTS

| Number | Name | Date |
| --- | --- | --- |
| 805,876 | O'Neill | Nov. 28, 1905 |
| 909,768 | Donaldson | Jan. 12, 1909 |
| 1,268,984 | McCormick | June 11, 1918 |
| 2,116,739 | Cason | May 10, 1938 |
| 2,481,073 | Brock | Sept. 6, 1949 |